Aug. 8, 1950     E. O. ROGGENSTEIN     2,518,378
TOTALIZER SENSING MECHANISM

Filed June 11, 1947     5 Sheets-Sheet 1

INVENTOR
E. O. ROGGENSTEIN
BY *Anthony Mantione*
AGENT

Aug. 8, 1950        E. O. ROGGENSTEIN        2,518,378
TOTALIZER SENSING MECHANISM
Filed June 11, 1947                            5 Sheets-Sheet 2
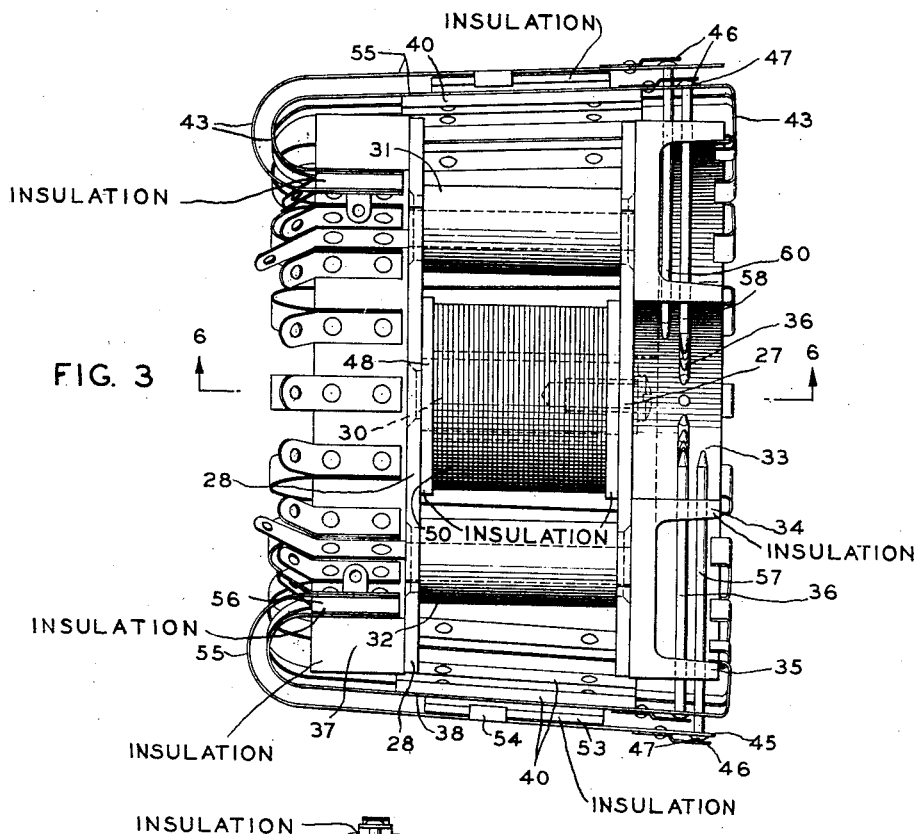
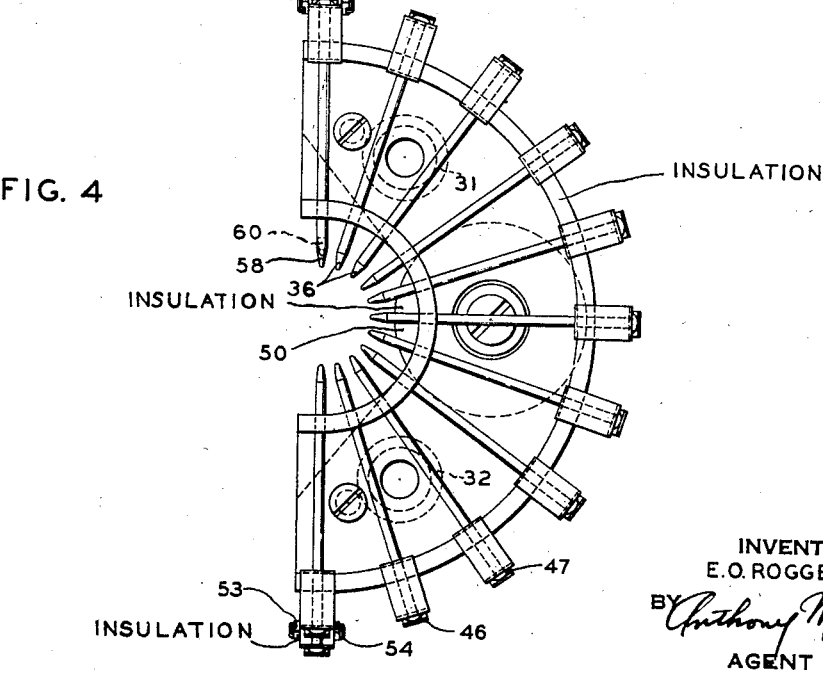
INVENTOR
E. O. ROGGENSTEIN
BY Anthony Monteverde
AGENT Aug. 8, 1950     E. O. ROGGENSTEIN     2,518,378
TOTALIZER SENSING MECHANISM
Filed June 11, 1947     5 Sheets-Sheet 3
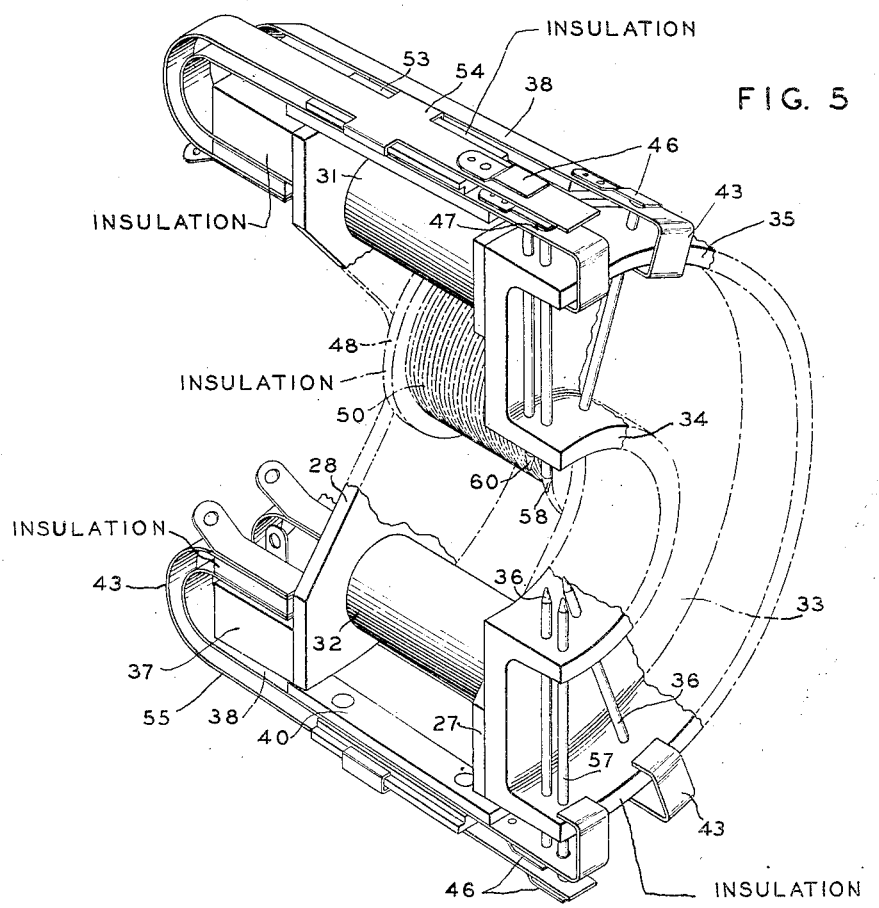
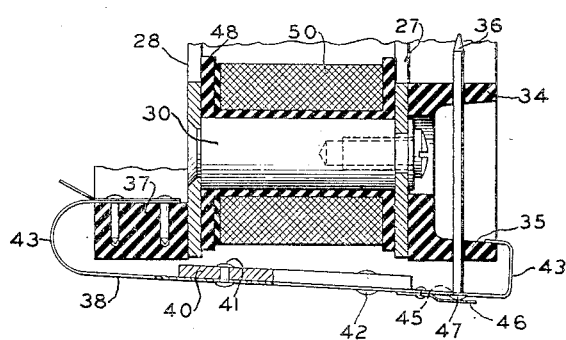
INVENTOR
E. O. ROGGENSTEIN
BY *Anthony Mantione*
AGENT Aug. 8, 1950  E. O. ROGGENSTEIN  2,518,378
TOTALIZER SENSING MECHANISM
Filed June 11, 1947  5 Sheets-Sheet 4
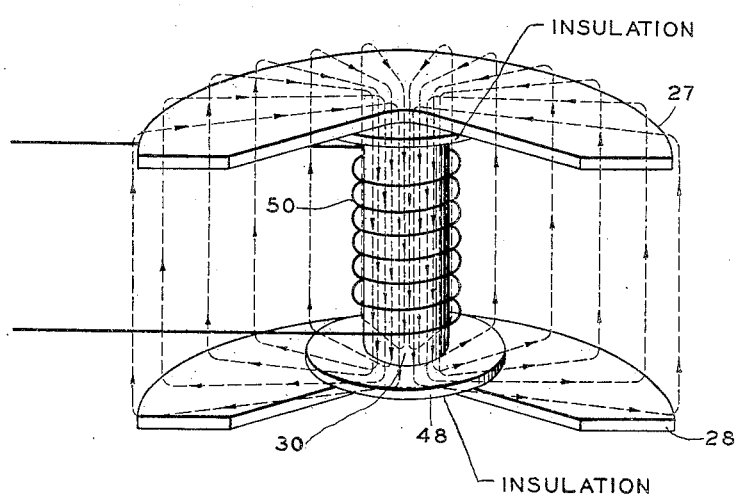
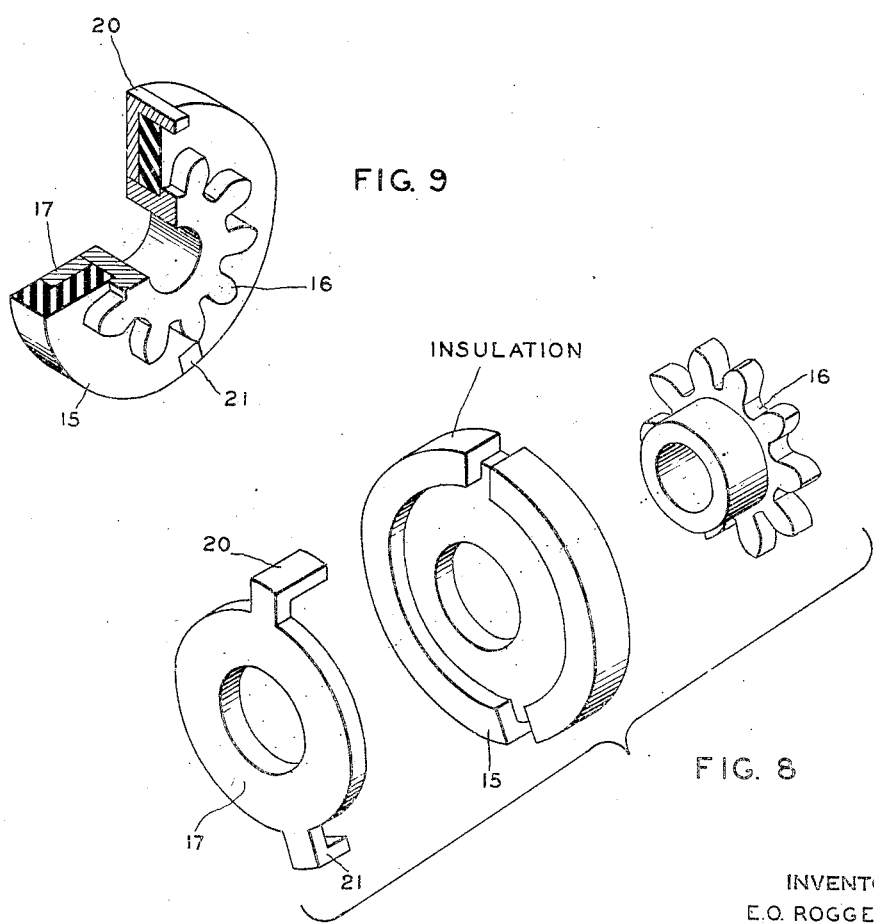
INVENTOR
E. O. ROGGENSTEIN
BY Anthony Montone
AGENT Aug. 8, 1950     E. O. ROGGENSTEIN     2,518,378
TOTALIZER SENSING MECHANISM Filed June 11, 1947     5 Sheets-Sheet 5

INVENTOR
E.O. ROGGENSTEIN
BY Anthony Mantione
AGENT

Patented Aug. 8, 1950

2,518,378

UNITED STATES PATENT OFFICE 2,518,378

TOTALIZER SENSING MECHANISM

Edwin O. Roggenstein, Ilion, N. Y., assignor to Remington Rand Inc., New York, N. Y., a corporation of Delaware Application June 11, 1947, Serial No. 753,955

23 Claims. (Cl. 235—59)

This invention relates to new and useful improvements in computing and recording machines and more particularly to improvements in devices thereon for sensing the value positions of the wheels of a totalizer especially when it is desired to print totals automatically.

The invention described herein is shown embodied in a Remington Bookkeeping Machine, of the type shown and described in Patent No. 2,364,758, dated December 12, 1944. However, while the invention is herein embodied in the above type of machine it will be understood that the same may be used in connection with any other type of recording and computing machine without departing from the scope of the invention.

The invention is particularly presented as an improvement over the device shown and described in the co-pending application of Emil F. Thierfelder, Serial No. 551,931, filed August 30, 1944 and entitled "Recording and Computing Machines" now Patent No. 2,480,981.

It is the principal object of the present invention to improve the operating characteristics of a totalizer sensing unit, and to increase the efficiency of totalizer sensing in a bookkeeping machine.

Another object of the invention is to obtain a greater degree of uniformity in sensing the individual digits of an entire array of digits of a totalizer unit.

A further object of the invention is to increase the sensing capacity in a device of the class described in order to operate supplementary electrical circuits useful in a computing and recording machine.

An additional object is to furnish a simple, efficient, and economically manufactured sensing device which will provide sensing mechanism for detecting space and symbol positions.

A still further object is to permit a more simple and efficient alinement of the sensing positions in a totalizer sensing unit in order to detect a nines' complement or a credit balance appearing on the totalizer wheels.

In carrying out the above objects the present invention provides a totalizer sensing unit carrying a plurality of projectable sensing elements electrically connected into the circuit of a bookkeeping machine. These elements are operated each time the travelling carriage of the bookkeeping machine traverses to a new position and are moved forward simultaneously and perform sensing operations through physical contact with the peripheral surfaces of numerically settable discs rotatably actuated by the totalizer numeral wheels, the values of which are to be printed, and which wheels have been moved to a position for printing such values. The discs associated with the individual totalizer wheels may have metallic contacts thereon relatively disposed in accordance with the value settings of the wheels. Each time the sensing elements are projected, one or more of them engage a metallic contact, and thence through the grounded totalizer complete an electrical circuit. In the present form, the projectable members are actuated by a plurality of reed-like armatures of magnetic material and to which the projectable members are suitably attached. The reed-like armatures are attracted by an electromagnet which is energized as each order of digits, carried by the totalizer reaches the sensing position, and are released upon de-energization of the electro-magnet when the carriage escapes from such position.

In carrying out the foregoing procedure, the present invention contemplates an arrangement of projectable elements in a radial manner to advance and contact the circumferential surface of each disc as it is presented for sensing. A radical departure from the construction of the relay as disclosed in the co-pending application to one Emil F. Thierfelder, Serial No. 551,931 now Patent No. 2,480,981, can be seen in the novel arrangement of the electro-magnet coil in relation to the armature positions. A more uniformly-distributed magnetic field is established throughout the entire structure in order to attract all the armatures with equal intensity. The utilization of a double sensing element assembly at the ends of each pole is also provided to control supplementary circuits as, for instance, space and symbol printing circuits which are controlled at one end, and a nines complement and a shift sensing control at the other.

The invention which is herein disclosed provides a more efficient functioning of the sensing unit and resides more specifically in a complete re-arrangement of the flux paths emitted by the electro-magnet structure. The pattern of the flux paths in this improved device provides a radially-distributed field over the entire array of reed-like armatures and the retractile tendency of the entire group of flux paths creates a stronger magnetic field which effectively attracts all of the armatures in the group. There is, however, a tendency of the individual flux paths to concentrate to a certain degree at the plate ends; and, advantage is taken of this effect to operate a double sensing element at these points in order to obtain supplementary sensing positions.

Other objects and structural details of the present invention will be apparent from the following description when read in connection with the accompanying drawings in which:

Fig. 3 is an elevational view of the face of the sensing disc past which the sensing discs of the new totalizer travel;

Fig. 4 is a right end view of the sensing unit showing the sensing pin mounting details;

Fig. 5 is an isometric view of the sensing head, partially broken, the view showing details of the double armature arrangement;

Fig. 6 is a top vertical sectional view of the assembled electromagnet taken substantially along the line 6—6 of Fig. 3, the view showing the associated sensing pin and armature construction;

Fig. 7 is a schematic view of the magnetic field pattern emitted by the sensing unit;

Fig. 8 is an exploded arrangement of enlarged isometric views of a digit sensing disc;

Fig. 9 is an enlarged isometric view, partially broken, of an assembled digit sensing disc;

Figure 1:
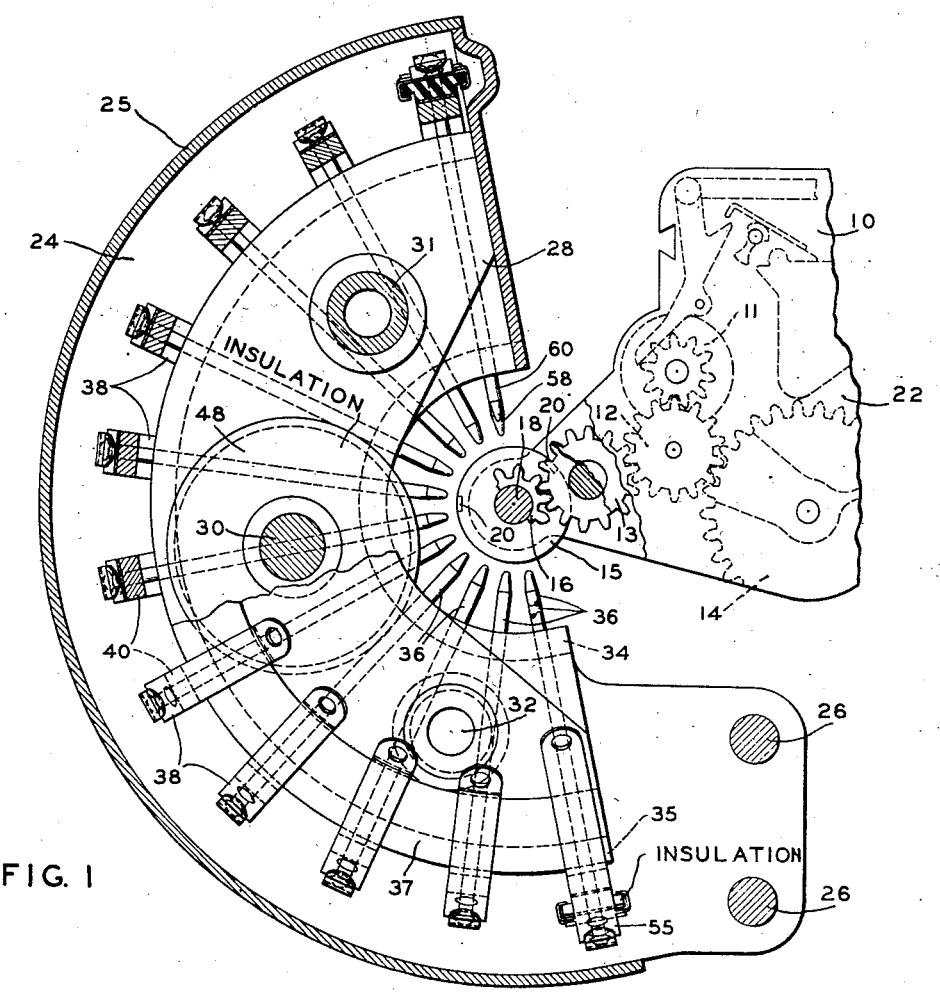
Figure 1 is a vertical section thru the cover plate of the sensing unit and discloses a partially broken-end view of the sensing head mechanism in association with the new totalizer.
Figure 2:
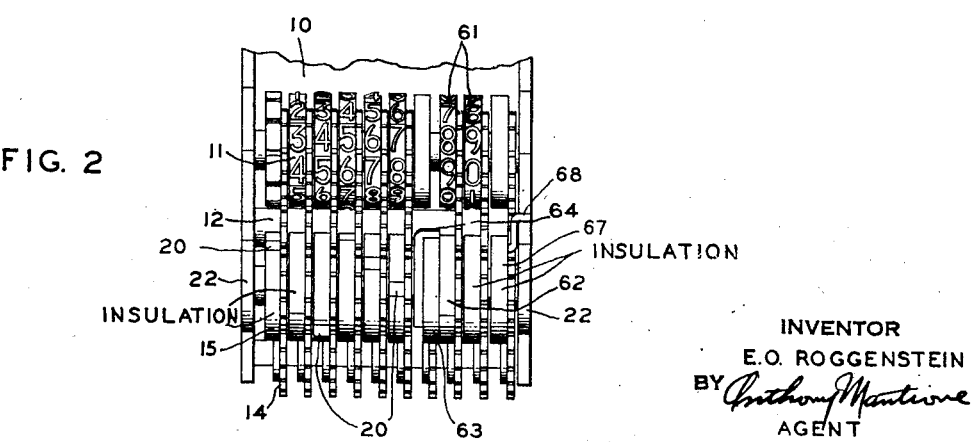
Fig. 2 is an elevational view of the front portion of the new totalizer.

In the operation of the standard Remington bookkeeping machine it is known that whenever the operator enters items on the sheet of a ledger, for instance, they are entered in vertical totalizers and at the same time are sequentially entered in one or more cross totalizers so that at the end of the horizontal line of entries the total of the line entries are set up in the cross totalizer and may then be printed out of the same onto the sheet.

A totalizer as above described is shown in the drawings and is designated 10. It has the usual number-dial wheel 11, intermediate wheels 12 and 13, and a carrier wheel 14 respectively in mesh. The carrier wheel 14 is engaged sequentially by the master wheel (not shown) of the well known actuator (also not shown) as the totalizer is moved step-by-step into position to permit each carrier wheel to mesh with the master wheel. A disc 15 is shown, preferably of insulating material such as fibre or the like, and provided with a small pinion 16 meshing with the intermediate gear 13 above mentioned. A conducting plate 17 is fastened to the side of each disc 15 and is in contact with the shaft 18 on which the disc 15 is mounted. Since the cross totalizer is preferably grounded, these metallic contact plates which are connected to each settable disc of each order of the totalizer, are connected to the ground circuit.

Metallic tabs projecting from the opposite ends of conducting plate 17 are bent over the periphery of the disc as at 20 and 21 to form peripheral contact elements (Figs. 8 and 9). The various wheels just described, together with the settable discs and shafts are mounted within the totalizer and suitably supported by the side plates 22 of the totalizer. The gearing ratio between the wheels mentioned is such that as the number dial wheel 11 makes a complete revolution in being positioned to successively represent the numbers from 0 to 9, the intermediate wheels 12 and 13 also make a full rotation so that sensing discs 15 associated with the several dial wheels are thus set to represent the same values as those in the dial wheels. As shown, the discs are turned through 180° in being positioned to represent five different values and through another 180° in being positioned to represent the remaining five values, thus requiring a full revolution in being set to represent the entire ten values from 0 to 9 inclusive.

As shown in Figure 1, a sensing head, embodying my improvements is disposed on the frame of the machine in a fixed position and is provided with a casing comprising side plates 24 and an arcuate cover plate 25. The plates are preferably secured to cross rods such as 26 which are normally used in the Remington machine. Two pole plates 27 and 28 (Fig. 3), each having curvatures concentric with the periphery of the sensing discs 15 (Fig. 1) are spaced therefrom a suitable distance so as to permit the discs 15 carried by the totalizer 10 to travel back and forth in a path adjacent to the pole plates of the sensing unit without contact therebetween. These pole plates are constructed of soft iron and are held in parallel disposition by the core pole 30 and mounting bushings, 31 and 32 respectively. The core pole 30 is preferably constructed of soft iron to provide magnetic permeability while the mounting bushings 31 and 32 may be of brass or other non-magnetic material. Securely fastened to pole plate 27 is the sensing pin mounting plate 33, preferably of fibre or plastic and provided with an arcuately-shaped channel, the curvature of which coincides with the curvature of the pole plate 27. This mounting plate is formed with parallel side walls 34 and 35 to support and slidably guide an array of projectable sensing pins 36. These are formed of a non-magnetic metal such as stainless steel or monel. Securely fastened to the other pole plate 28 is an armature reed mounting block 37 of fibre or other non-conductive material, serving to support the array of armature carrying reed springs 38 which are riveted to the inner surface of the mounting block. These reed springs are constructed of a non-ferrous resilient metal such as beryllium and serve to support the soft iron armatures 40 which are riveted to the reed springs at 41 and 42. The resilient nature of these springs urges them continuously to draw away from the sensing pin mounting plate 33. In order to retain them at a proper distance and to limit their travel, their upper portions are provided with a bent portion 43 to hook over the sensing pin mounting-block channel wall 35. At the upper extremity of each individual armature reed-spring 38, an aperture 45 is provided for slidably carrying the sensing pins 36. Sensing pin retainers 46, of non-ferrous metal, are pivotally fastened to the armature reed springs adjacent the aperture 45 to project the sensing pins when the reed-springs are attracted inwardly by magnetic influence upon the soft iron armatures 40. Each of the projectable sensing pins 36 is formed with a flanged head 47 to retract the sensing pins during outward travel of the armature reed springs 38. This occurs instantly whenever the magnetic field is de-activated.

*General operation*

Surrounding the core pole 30 is a bobbin 48 of fibre or other non-conducting material upon which a magnet coil 50 is wound. When the coil 50 is energized, the magnet pole plates 27 and 28 create an arrangement of magnetic lines of force extending around the device over a definite area as illustrated diagrammatically in Fig. 7. These loops or whorls radiate from the core poles to form a complete circuit, that is, lines of force emerge from the north pole of the magnet, extend in a loop through the space medium, and enter the south pole of the magnet when the coil 50 is energized. In so doing, the magnet builds up a strained effect in the intervening space medium between the two pole plates and, in an effort to overcome this condition, the armatures 40 are drawn inwardly to complete the magnetic circuit. Through this improved arrangement of the magnetic field, the lines of force are tightened by the approaching armatures which have been attracted by their influence. In this manner the total distributed magnetic influence is increased. The attraction on the armatures 40 inwardly when the coil 50 is energized will urge the outer ends of the armature reed-springs 38 against the sensing pins 36 and thereby project the sensing pins toward the settable sensing discs 15. This action occurs after the carriage has been stopped to place a given order over the master wheel of the actuator and the printing of the value of the particular order is to take place. The plane of movement of the projectable sensing pins 36 is the same as that of the master wheel of the actuator on the frame of the machine (not shown) and therefore when the pins are projected they will contact the periphery of the discs 15 in an order which is in operative position with respect to the actuator. Whichever of the metallic pins engage contacts on the periphery of the discs, such will make circuit connections required for operation of a machine of the class described. As soon as the coil 50 is de-energized, the armature reed springs 38 will retract to a normal position and the projectable sensing pins 36 will be redrawn outwardly to a normal position as shown in Fig. 1.

From a further consideration of Fig. 1, it will therefore be understood that when the magnet coil 50 is energized, all the armature reed springs 38 will be pulled inwardly thus projecting all the projectable sensing pins 36 toward the totalizer sensing wheels at the same time. Those that contact plates on the disc then in position will establish circuits and those that do not will merely contact with the insulating material of which the disc 15 (Figs. 8 and 9) is formed.

In the normal operation of a totalizer, the numeral wheels of the totalizer rotates 360° to represent the ten digits 0 to 9. Consequently, a totalizer wheel will be required to turn a distance of 36° for each individual digit represented, and inasmuch as the sensing discs 14 are operated through the intermediate gears, 12 and 13, they will likewise turn a distance of 36°. Consequently, the sensing disc 15 is constructed with two electrical conducting surfaces 20 and 21 positioned as shown in Figs. 8 and 9, in order that the five digits 0-1-2-3 and 4 may be sensed from the peripheral contact 20 and the remaining digits 5-6-7-8 and 9 may be sensed from the second peripheral contact 21.

Referring to Fig. 5 it will be observed that double projectable sensing pin assemblies are provided at the end extremities of the sensing unit. At both of these points, in addition to the regular armature reed spring 38, there is provided an insulator 53 preferably of fibre, and securely riveted to the regular armature reed-spring 38.

The width of this insulator is sufficiently greater than that of the armature reed-spring to permit the wing portions 54 formed at the sides of the superposed armature reed springs 55 to clinch over the extended insulator portions, forming thereby a secure fastening of one reed spring over the other without electrical contact therebetween. Each double reed-spring assembly, of which there are two per unit, is provided with one common armature 40. An armature reed mounting insulator consisting of a small block of fibre 56 is securely fastened to the mounting block 37, for fixedly holding the superposed armature reed spring 55 in parallel disposition with respect to the underlying armature reed spring 38 while at the same time insulating each member in order to maintain separate electrical circuits. Each of the assembled reed springs 38 and 55 carry a projectable sensing pin at their upper extremities in parallel disposition. When the magnet coil 50 is energized, the armatures on the double reed spring assemblies will draw inwardly both of the reeds at the same time inasmuch as they are both fixedly attached to the common armature 40.

According to Fig. 3 and Fig. 5, the double sensing pin assembly at one end of the unit carries on one reed 38 a sensing pin 36 for sensing the "9" digit and the superposed reed 55 moving concomitantly with the reed 38 carries a shift sensing pin 57 for sensing a credit balance whenever the totalizer wheels go into reverse rotation. From a consideration of the $\frac{1}{10}$" spacing between the shift sensing pin 57 and the "9" sensing pin 36, and the further fact that the spacing between the sensing discs are similarly $\frac{1}{10}$" apart, it is clear that the "shift" sensing pin 57 and the "9" sensing pin will contact adjoining sensing discs whenever the double sensing pin assembly is drawn inwardly. It is well known in the totalizer art, that whenever the numeral wheel next to the wheel of highest order registers a "9" digit, it is indicative of a credit balance. Therefore, as soon as the "shift" sensing pin contacts a "9" digit in this order, it immediately energizes a circuit which shifts an entire bank of printing magnets to print complementary digits of the numerals appearing on the totalizer wheels.

Figure 12:
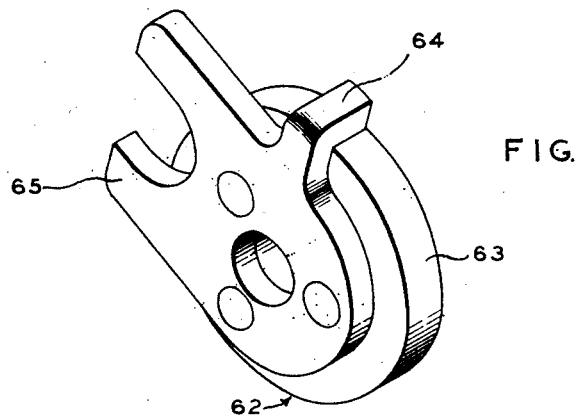
Fig. 12 is an enlarged isometric view of an assembled space sensing disc.

At the other end of the relay a "symbol" and "space" sensing pin assembly (Figs. 3 and 5), similar in general construction to the "9" digit and shift sensing pin assembly described above, is located to sense specific applications required in a machine of the class described. The space sensing pin 58 is disposed directly in line with the regular digit sensing pins 36. At a distance of $\frac{1}{10}$" to the right of this pin is a symbol sensing pin 59. As the decimal ($.00) wheels 61 of the totalizer are moved past the sensing unit, a special "space" sensing disc 61 is reached on the sensing disc shaft 17. The construction of the "space" sensing disc as seen in Fig. 12 provides an insulated disc 63 carrying a stationary metallic contact plate 64 securely fixed to one face of the insulator 63 and a slotted projection 65. The purpose of this slotted projection is to hold the space sensing contact 64 constantly in a non-rotative position but so disposed as to lie continually in the path of travel of the space sensing pin 58. It is clear therefore, that whenever the space sensing pin is in the decimal column ($.00) and is about to move into the next higher order, physical contact of the sensing pin 58 with the sensing disc 62 will energize appropriate circuits (not shown) for actuating a spacing mechanism on a machine of the class described. In this manner a line of demarcation or significant spacing will be provided in the printed digits to indicate divergence between whole numbers and decimals or more specifically, dollars and cents values.

Figure 11:
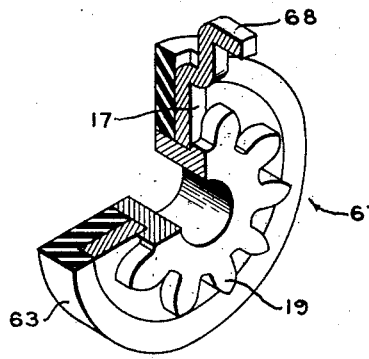
Fig. 11 is an enlarged isometric view, partially broken, of an assembled symbol sensing disc.
Figure 10:
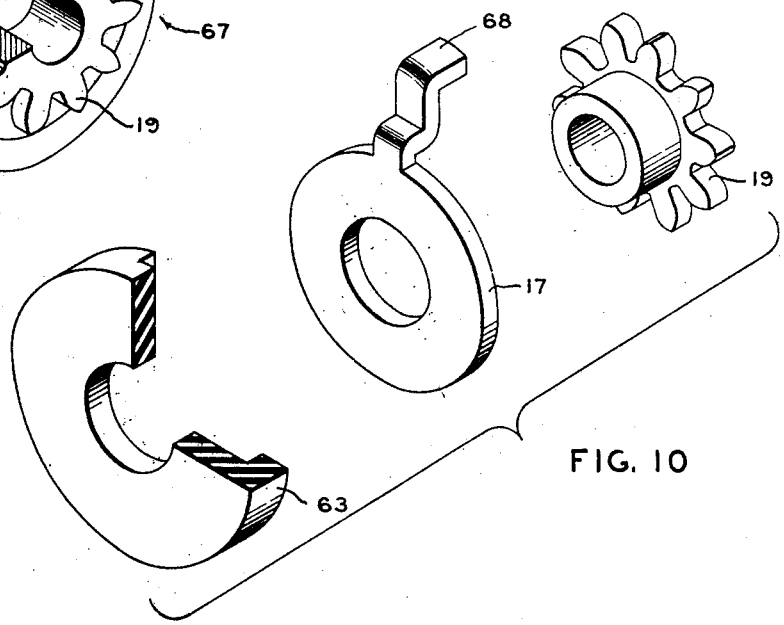
Fig. 10 is an exploded arrangement of enlarged isometric views of a symbol sensing disc.

From a further consideration of the double armature reed-spring assembly shown in Figs. 3 and 5, the extra sensing pin 60 is provided for cooperation with a sensing disc 67 (Fig. 11) which disc, when in a certain operative position, is indicative of a cleared register after the printing of an automatic total. The construction of this disc provides a raised contact 68, the height of which is substantially greater than that of the space sensing disc contact 64. This provision is made in order to permit the symbol sensing pin 60 to contact the symbol sensing disc contact 68 when in the symbol sensing position; but due to its relatively shorter length, preventing it from making contact with the space sensing contact 64. It will be clear that such provision is made in order to eliminate any possibility of the space sensing wheels to energize a clear signal circuit and thereby erroneously print a symbol indicative of a cleared register.

Mechanism for operating the clear signal mechanism may be of the type described in the U. S. patent application of Emil F. Thierfelder, Serial No. 548,909, filed August 10, 1944, now Patent No. 2,473,738.

While it is understood that the projectable rods or sensing pins described in the foregoing specification are provided for cooperation with various circuits to control and actuate certain printing magnets and relays, such circuits are not specifically disclosed in this application but are the subject of an application to be filed later.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a machine of the class described, a sensing head including an arcuate support, a series of radially disposed projectable members on said support, holding means associated with said members to hold said members in retracted position, and magnetically operating means common to said members to project said members against the resistance of said holding means, said magnetically operating means including a magnetic field having its axis substantially parallel to said holding means.

2. In a machine of the class described, a sensing head including an arcuate support, a series of radially disposed projectable members on said support, holding means associated with said members to hold said members in retracted position hooked limiting means disposed at the free ends of such holding means and cooperable with said support to limit the extent of retraction of the projectable members, and magnetically operating means common to said members to project said members against the resistance of said holding means, said magnetically operating means including a magnetic field having its axis substantially parallel to said holding means.

3. In a machine of the class described, a sensing head including an arcuate support, a series of radially disposed projectable members on said support, holding means associated with said members to hold said members in retracted position, and magnetically operating means common to said members to project said members against the resistance of said holding means, said magnetically operating means including a magnetic field having its axis substantially perpendicular to the plane of motion of said projectable members.

4. In a machine of the class described, a sensing head including an arcuate support, a series of radially disposed projectable members on said support, resilient reed-like elements associated with said members to hold said members in retracted position, and magnetically operating means common to said members to project said members against the resistance of said resilient reed-like elements, said magnetically operating means including a magnetic field having its axis substantially parallel to said elements.

5. In a machine of the class described, a sensing head including an arcuate support, a series of radially disposed projectable members on said support, resilient reed-like elements associated with said members to hold said members in retracted position, and magnetically operating means common to said members to project said members against the resistance of said resilient reed-like elements, said magnetically operating means including a magnetic field having its axis substantially parallel to said holding means and arranged to establish a plurality of magnetic circuits enveloping said resilient reed-like elements.

6. In a machine of the class described, a sensing head including an arcuate support, a series of radially disposed projectable members on said support, resilient reed-like elements associated with said members to hold said members in retracted position, and magnetically operating means common to said members to project said members against the resistance of said resilient reed-like elements, said magnetically operating means including a magnetic field having its axis substantially parallel to said resilient reed-like elements, and said projectable members being movable in a plane substantially perpendicular to the axis of said magnetic field.

7. In a machine of the class described, a sensing head including an arcuate support, a series of radially disposed projectable members on said support, resilient reed-like elements associated with said members to hold said members in retracted position, and magnetically operating means common to said members to project said members against the resistance of said holding means, said magnetically operating means including an upper and lower pole plate separated by a core pole fixedly held therebetween and having its axis substantially parallel to said resilient reed-like elements.

8. In a machine of the class described, a sensing head including an arcuate support, a series of radially disposed projectable members on said support, holding means associated with said members to hold said members in retracted position, and magnetically operating means common to said members to project said members against the resistance of said holding means, said magnetically operating means including an upper and lower pole plate separated by a core pole fixedly held therebetween, and having its axis substantially perpendicular to the plane of motion of said projectable members.

9. In a machine of the class described, a sensing head including an arcuate support, a series of radially disposed projectable members on said support, resilient reed-like elements associated with said members to hold said members in retracted position, and magnetically operating means common to said members to project said members against the resistance of said resilient reed-like elements, said magnetically operating means including a common group of magnetic circuits having their axis substantially parallel to said resilient reed-like elements and arranged in such a manner that the magnetic circuits are completed lengthwise through said resilient elements.

10. In a machine of the class described, a sensing head including an arcuate support, a series of radially disposed projectable members on said support, resilient reed-like elements associated with said members to hold said members in retracted position, one or more of said resilient members adapted to hold a plurality of said projectable members in retracted position, and magnetically operating means common to said members to project said members against the resistance of said resilient reed-like elements, said magnetically operating means including a magnetic field having its axis substantially parallel to said resilient reed-like elements.

11. In a machine of the class described, a sensing head including an arcuate support, a series of radially disposed projectable members on said support, resilient reed-like elements associated with said members to hold said members in retracted position, one or more of said resilient members adapted to hold a plurality of said projectable members in retracted position, and magnetically operating means common to said members to project said members against the resistance of said resilient reed-like elements, said magnetically operating means including a magnetic field having its axis substantially parallel to said resilient reed-like elements and arranged to establish a plurality of magnetic circuits enveloping said reed-like elements.

12. In a machine of the class described, a sensing head including an arcuate support, a series of radially disposed projectable members on said support, resilient reed-like elements associated with said members to hold said members in retracted position, one or more of said resilient reed-like elements adapted to complete a plurality of electrical circuits at one time and the others adapted to complete only one circuit at a time, and magnetically operating means common to said members to project said members against the resistance of said resilient reed-like elements, said magnetically operating means including a magnetic field having its axis substantially parallel to said resilient reed-like elements.

13. In a machine of the class described, a plurality of numeral wheels and associated settable discs to be sensed, a sensing head including an arcuate support, a series of radially disposed projectable members on said support, said projectable members adapted for movement towards said settable discs, holding means associated with said members to hold said members in retracted position, and magnetically operated means common to said projectable members to project said members towards said settable discs as they are presented for sensing, said magnetically operated means including a common axis substantially perpendicular to the plane of motion of said radially disposed projectable members.

14. In a machine of the class described, a plurality of numeral wheels and associated settable discs to be sensed, peripherally disposed contact members on said settable discs, a sensing head including an arcuate support, a series of radially disposed projectable members on said support, said projectable members adapted for movement toward said settable discs, resilient reed-like elements associated with said members to hold said members in retracted position, and magnetically operated means common to said projectable members to project said members towards said settable discs as they are presented for sensing, said magnetically operated means including a common axis substantially perpendicular to the plane of motion of said radially disposed projectable members.

15. In a machine of the class described, a plurality of numeral wheels and associated settable discs to be sensed peripherally disposed contact members on said settable discs, a sensing head including an arcuate support, a series of radially disposed projectable members on said support, certain of said projectable members adapted for movement toward one of said settable discs, and certain others adapted to contact more than one of said discs said projectable members adapted for movement to and from said settable discs in unison, resilient reed-like elements associated with said members to hold said members in retracted position, and magnetically operated means common to said projectable members to project said members towards said settable discs as they are presented for sensing, said magnetically operated means including a common axis substantially perpendicular to the plane of motion of said radially disposed projectable members.

16. In a machine of the class described, a plurality of numeral wheels and associated settable discs to be sensed, peripherally disposed contact members on said settable discs, a sensing head including an arcuate support, a series of radially disposed projectable members on said support, said projectable members adapted for movement toward said settable discs, holding means associated with said members to hold said members in retracted position, and electromagnetic means for controlling the movement of said projectable members to and from said settable discs, said means including an upper and lower pole plate separated by a core pole fixedly held therebetween, said core pole having its axis substantially perpendicular to the plane of movement of said radially disposed projectable members.

17. In a machine of the class described, a plurality of numeral wheels and associated settable discs to be sensed, peripherally disposed contact members on said settable discs, a sensing head including an arcuate support, a series of radially disposed projectable members on said support, certain of said projectable members grouped to contact more than one of said settable discs when the discs are in a certain predetermined position and to contact only one of said settable discs when in another predetermined position, resilient reed-like elements associated with said members to hold said members in retracted position, and electro-magnetic means for controlling the movement of said projectable members to and from said settable discs, said means including an upper and lower pole plate separated by a core pole fixedly held therebetween and having its axis substantially perpendicular to the plane of movement of said radially disposed projectable members.

18. In a machine of the class described, a plurality of numeral wheels and associated settable discs to be sensed, peripherally disposed contact members on said settable discs, a sensing head including an arcuate support, a series of radially disposed projectable members on said support, certain of said projectable members grouped to contact more than one of said settable discs when the discs are in a certain predetermined position and to contact only one of said settable discs when in another predetermined position, resilient reed-like elements associated with said members to hold said members in retracted position, and electro-magnetic means for controlling the movement of said projectable members to and from said settable discs through a path parallel to the surface of said pole plates in a radially inward direction toward the axis of said settable discs, said means including an upper and lower pole plate separated by a core pole fixedly held therebetween and having its axis substantially parallel to said resilient reed-like elements.

19. In a machine of the class described, having a series of numeral wheels and associated settable discs to be sensed, an arcuate support, a series of radially disposed projectable members on said support, certain of said projectable members adapted to contact more than one of said settable discs concomitantly when said discs are in a certain predetermined position and to contact only one of said discs when in another predetermined position, holding means associated with said members to hold said members in retracted position, and magnetically operating means common to said members to project said members against the resistance of said holding means, said magnetically operating means including a magnetic field having its axis substantially parallel to said holding means.

20. In a machine of the class described, having a series of numeral wheels and associated settable discs to be sensed, an arcuate support, a series of radially disposed projectable members on said support, said projectable members normally spaced from the discs and radially disposed towards the axis of said discs, holding means associated with said members to hold said members in retracted position, and magnetically operating means common to said members to project said members against the resistance of said holding means, said magnetically operating means including a magnetic field having its axis substantially parallel to the axis of said settable discs.

21. In a machine of the class described, having a series of numeral wheels and associated settable discs to be sensed, said discs being rotatable through an angle of 360° to represent the number values from 0-9 appearing on said numeral wheels, an arcuate support, a series of radially projectable members on said support, said projectable members being spaced from said settable discs and radially disposed towards the axis of said discs, holding means associated with said members to hold said members in retracted position, said holding means being positioned in a plane substantially parallel to the axis of said settable discs hooked limiting means disposed at the free ends of said holding means and cooperable with said support to limit the extent of retraction of the projectable members, and magnetically operating means common to said projectable members to project said members against the resistance of said holding means, said magnetically operating means including an upper and lower pole plate separated by a core pole fixedly held therebetween and having its axis substantially parallel to said holding means.

22. In a machine of the class described having a totalizer numeral wheel and an associated settable disc to be sensed, said disc being movable through an angle of 360 degrees thereby to represent numbers from 0-9 inclusive, a sensing head comprising a series of magnetically projectable rods disposed adjacent and in the plane of said settable disc when it is moved to position to be sensed and radially along lines of which the center of the disc is the center, resilient holding means associated with said magnetically projectable rods to hold said rods in retracted position, and electro-magnetic means common to said electro-magnetically projectable rods to counteract said holding means, said electromagnetic means having a magnetic field the axis of which is substantially parallel to said holding means.

23. In a machine of the class described, a sensing head comprising a support, a series of radially disposed projectable members on said support, holding means associated with said members to hold said members in retracted position, and magnetically operating means common to said members to project said members against the resistance of said holding means, said magnetically operating means including an upper and lower pole plate separated by a core fixedly held therebetween and having its axis substantially parallel to said holding means, and said projectable members being movable through a path parallel to the surface of said pole plates in a radially inward direction.

EDWIN O. ROGGENSTEIN.

REFERENCES CITED

The following references are of record in the file of this patent:

UNITED STATES PATENTS

| Number | Name | Date |
|---|---|---|
| 1,928,656 | Von Reppert | Oct. 3, 1933 |
| 2,172,749 | Going | Sept. 12, 1939 |
| 2,364,758 | Roggenstein | Dec. 12, 1944 |
| 2,412,537 | Roggenstein | Dec. 10, 1946 |
| 2,480,981 | Thierfelder | Sept. 6, 1949 |